3,359,269
3-AMINO-5-SUBSTITUTED-PYRAZINOYL-
GUANIDINES
Edward J. Cragoe, Jr., Lansdale, Pa., assignor to Merck
& Co., Inc., Rahway, N.J., a corporation of New
Jersey
No Drawing. Filed Mar. 16, 1966, Ser. No. 534,640
The portion of the term of the patent subsequent to
Apr. 11, 1984, has been disclaimed
13 Claims. (Cl. 260—250)

This application is a continuation-in-part of my co-pending United States patent applications Ser. No. 356,042 filed Mar. 31, 1964 (now abandoned), and Ser. No. 313,315 filed Oct. 7, 1963, now Patent No. 3,313,813.

This invention is concerned with novel (3-amino-5-R-pyradinoyl)guanidines as well as pharmaceutically acceptable salts thereof and with novel methods for their preparation.

The compounds of this invention can be represented by the structural formula

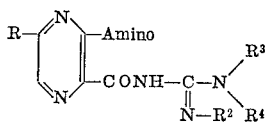

and pharmaceutically acceptable salts thereof, especially the hydrochloride and methane sulfonate salts and the like wherein R is
  (1) hydroxyl,
  (2) amino, advantageously having the structure

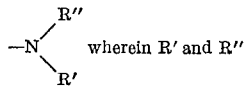   wherein R′ and R″ can be similar or dissimilar radicals and respectively represent
    (a) hydrogen,
    (b) amino or mono- or di-lower-alkylamino, (advantageously forming a hydrazino group at the 5-position carbon),
    (c) lower alkoxy,
    (d) lower alkyl either straight or branched chain or cyclic (3- to 6-membered rings) and either unsubstituted or containing one or more substituents such as
      (i) hydroxyl,
      (ii) fluoro,
      (iii) a cycloalkyl substituent having 3 to 6 carbons in the cycloalkyl structure,
      (iiii) an aryl substituent preferably phenyl or substituted phenyl such as lower-alkyl-phenyl and alkoxyphenyl as methoxyphenyl, ethoxyphenyl, and the like, or a
      (iiiii) heterocyclic substituent especially furyl, pyridyl, and

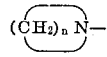

wherein $n$ is one of the numerals 4 through 6, or an
      (iiiiii) amino substituent as the unsubstituted amino, or mono- or di-lower-alkyl amino,
    (e) and when R′ and R″ each represents a lower alkyl, the lower alkyl groups can be linked together to form a cyclic structure with the nitrogen atom to which they are attached, particularly a 5- to 8-membered ring, advantageously forming with the nitrogen atom a 1-pyrrolidinyl, piperidino, hexahydro-1-azepinyl, or octahydro-1-azocinyl radical and the like,
    (f) aryl, advantageously an unsubstituted or substituted phenyl, wherein the substituent(s) are preferably lower alkyl (methyl, ethyl, propyl, isopropyl) and the like,
    (g) amidino or substituted amidino, especially an N,N-di-lower alkyl-amidino, such as N,N-di-methylamidino;
  (3) lower alkyl, either straight or branched chain lower alkyl or cyclic or cyclopropyl, cyclohexyl or other cycloalkyl group which can be substituted with, for exampe, lower alkyl group(s),
  (4) lower alkoxy, the alkyl moiety being straight or branched chain or cyclic of the type hereinbefore described, or
  (5) mononuclear-aryl or
  (6) mononuclear-aryl-lower-alkyl, the aryl moieties [in (5) and (6)] being either unsubstituted or having one or more substituents especially selected from lower alkyl or lower alkoxy.

$R^2$ is hydrogen or lower alkyl;
$R^3$ is
  (1) hydrogen,
  (2) lower alkyl, either saturated or unsaturated and substituted or unsubstituted, the substituent group(s) preferably being
    (a) hydroxyl,
    (b) aryl, either mono- or di-nuclear aryl, as phenyl or naphthyl, and either unsubstituted or containing one or more substituents, especially selected from
      halogen,
      lower alkyl,
      lower alkoxy, or any combination of these substituent groups
    (c) mono- or di-lower alkylamino, wherein the alkyl groups may be linked to form a hetero structure with the amino-nitrogen to which they are attached such as to form an azacycloalkyl group,
    (d) heterocyclic, and especially the pyridyl group,
    (e) halogen,
  (3) aryl or substituted aryl, the substituent group(s) preferably being
    halogen, and
    lower alkyl,
  (4) heterocyclic, advantageously a pyridyl radical,
  (5) alkylideneamino, and
  (6) acyl;
$R^4$ is
  (1) hydrogen
  (2) lower alkyl, either saturated or unsaturated and substituted or unsubstituted as described above for $R^3$; or
$R^3$ and $R^4$ can be lower alkyl groups linked directly together or through a hetero atom, especially through oxygen or nitrogen to produce a 5 to 8 membered cyclic structure, thus forming with the nitrogen atom to which they are attached a
    1-pyrrolidinyl,
    piperidino,
    1-piperazinyl, especially a 4-lower alkyl-1-piperazinyl or morpholino, and the like radicals;
and when $R^2$ and $R^3$ (or $R^4$) each represents a lower alkyl, they can be linked together to form a cyclic structure with the nitrogen atoms to which they are attached, particularly to form a 2-(2-imidazolinyl)radical.

The 3-position amino group can be an unsubstituted amino as well as mono- or di-substituted amino groups, the substituent(s) advantageously being lower alkyl and lower alkanoyl and also where the substituents are linked to form a heterocyclic structure with the amino nitrogen to which they are attached.

The compounds of this invention are useful because they possess diuretic and natriuretic properties. As diuretic agents, they can be used for the treatment of edema, hypertension and other diseases known to be responsive to this therapy.

In some instances it may be desirable to make a salt of these compounds using a pharmaceutically acceptable acid, and these salts are to be considered as included in this invention and in the scope of the claims.

The products of this invention can be administered to man or animals in the form of pills, tablets, capsules, elixirs, injectable preparations and the like and can comprise one or more of the compounds of this invention as the only essential active ingredient of the pharmaceutical formulation or, as mentioned above, the novel compound(s) can be combined in pharmaceutical formulations with other diuretic agents or, indeed, other therapeutic agents.

The compounds of this invention are advantageously administered at a dosage range of from about 5 mg./day to about 1 g./day or at a somewhat higher or lower dosage at the physician's discretion, preferably in subdivided amounts on a 2 to 4 times a day regimen.

One generally useful process for the preparation of the novel compounds of this invention can be represented as follows:

METHOD A

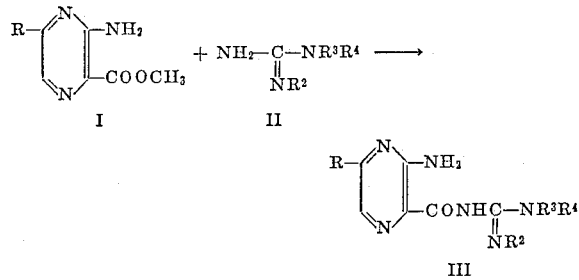

Method A synthesis involves the reaction of a pyrazinoic acid ester of the type illustrated by Compound I with a guanidine of the type illustrated by Compound II. The methyl ester is shown for illustrative purposes only since the ester may be that of certain other alcohols, especially lower aliphatic alcohols. It will be noted that this alkoxy (ester) radical does not appear in the desired end product.

Synthesis by Method A is preferably carried out under anhydrous conditions either with or without a solvent such as mehanol, ethanol, isopropyl alcohol or other solvents. The reaction may be carried out at room temperature or by heating on a steam bath for 1 minute to 2 hours or longer. The desired product usually is recovered from the cooled reaction mixture by trituration with water. Purification frequently is carried out by converting the product to a salt which can be recrystallized or the base can be regenerated by addition of aqueous alkali.

Another method which is useful in preparing the compounds of this invention including having an acyl substituent attached to the 3-amino group, can be illustrated as follows:

METHOD B

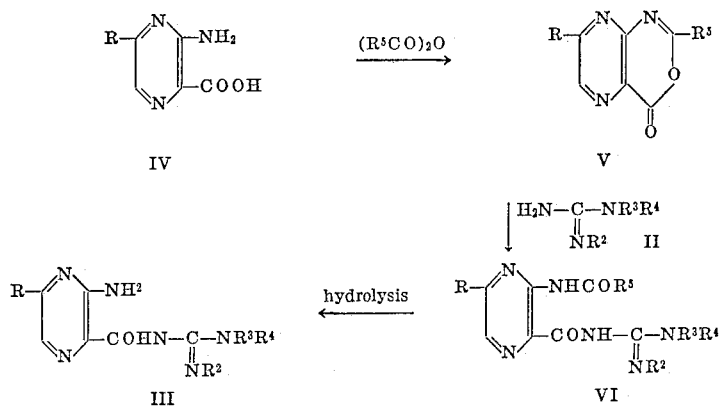

When Compound IV is heated with a lower alkanoic acid anhydride ($R^5CO$—O—CO—$R^5$) a 2-alkyl-4H-pyrazino-[2,3-d]-[1,3]oxazin-4-one (Compound V) is obtained. To obtain the Compound V in which $R^5$ equals hydrogen, Compound IV is heated with a mixture of formic acid and acetic anhydride. Compound V then is dissolved in a solvent such as ethyl acetate, for example, and is heated in an atmosphere of nitrogen with the guanidine (Compound II) to produce Compound VI. Compound VI will be recognized as one of the compounds of the invention having an acyl radical attached to the amino group in the 3-position of the nucleus. This acyl group can be removed readily by hydrolysis to form Compound III.

It will be appreciated that when the 5-position R group in Compound IV either is or contains a functional group that would react with the lower alkanoic acid anhydride, the corresponding acylated derivative of V and of VI would form. However, subsequent hydrolysis would regenerate the original or unacylated R substituent.

The acid salts of the [3-amino-5-substituted-pyrazinoyl]guanidines can be prepared by any suitable known method. Particularly useful salts are the hydrohalide salts as hydrochloride, hydrobromide, hydriodide, the sulfate, phosphate and other inorganic acid salts as well as organic acid salts as the acetate, maleate, tartrate and the like salts.

*Preparation of 3-amino-5-R-pyrazinoic acid esters*

The 3-amino-5-substituted-pyrazinoic acid ester used as starting material in Method A is prepared either by (1) catalytic hydrogenolysis of a 3-amino-5-substituted-6-chloro-pyrazinoic acid ester (VII) to remove the 6-position chlorine, or by (2) esterification of 3-amino-5-substituted-pyrazinoic acid (IV).

The chlorine atom is removed readily from ester Compound VII by catalytic hydrogenolysis using a catalyst of palladium supported on charcoal in the presence of a base, preferably magnesium oxide.

Esterification of the acid Compound IV is carried out in conventional manner as by the reaction of the pyrazinoic acid with a lower alkanol in the presence of a mineral acid such as hydrochloric, sulfuric or similar acid. Methanol, ethanol, propanol, butanol and other lower alkanols can be used in this process.

Preparation of Compound VII

The 3-amino-5-substituted-6-chloropyrazinoic acid ester (VII) can be made by one or more of several methods illustrated below, one of which may be more useful than another for making a specific compound. As the details concerning the actual reaction conditions are provided in the examples, the reaction scheme for each of the preferred procedures is provided without discussion.

VIA DISPLACEMENT OF 5-HALOGEN

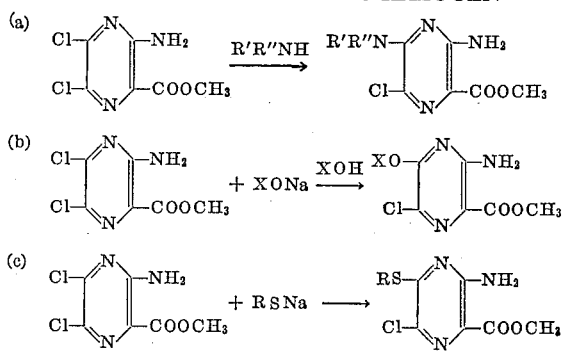

X can be lower alkyl or the like.

DISPLACEMENT OF A 5-METHYLSULFINYL RADICAL

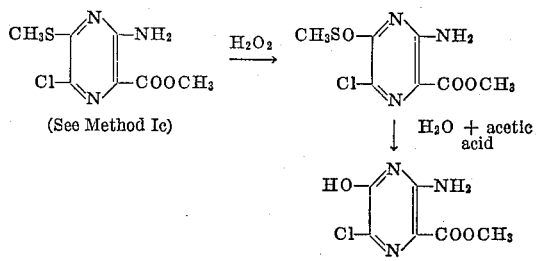

Preparation of Compound IV

The 3-amino-5-substituted-pyrazinoic acid (IV) that is employed as a starting material in Method B can be made by hydrolysis of the corresponding ester. Another method which is limited to reactants and end products where the 5-substituent is lower alkyl, cycloalkyl, cycloalkylalkyl, aryl or aralkyl, is illustrated below. It will be recognized that these acids can be esterified for use in Method A also. Again, as the reaction conditions are given in detail in the examples, the reaction scheme is provided without discussion.

VIA A LUMAZINE

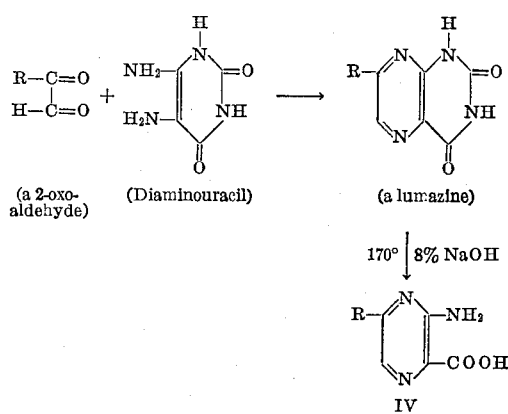

While generally useful methods are illustrated above for the preparation of the starting materials used in Methods A and B above, other methods for making certain needed starting materials will be described in the following examples.

The following examples also are illustrative of the methods by which the products of this invention can be prepared and are not to be considered as limiting the invention to the particular procedural conditions employed or to the particular compounds prepared thereby.

*Example 1.—(3-amino-5-hydroxypyrazinoyl) guanidine hydrochloride*

Step A: Preparation of methyl 3-amino-5,6-dichloropyrazinoate.—Methyl 3-aminopyrazinoate (765 g., 5 moles) is suspended in 5 liters of dry benzene. While stirring under anhydrous conditions sulfuryl chloride (1.99 liters, 3318 g., 24.58 moles) is added over a period of 30 minutes and stirring is continued for 1 hour. During this period, the temperature rises to about 50° C. and then begins to drop. The mixture is heated cautiously to reflux (60° C.), refluxed for 5 hours and then stirred overnight at room temperature. The excess sulfuryl chloride is distilled off at atmospheric pressure (distillation is stopped when vapor temperature reaches 78° C.). The dark red mixture is chilled to 6° C. The crystals are filtered off, washed by displacement with two 100 ml. portions of cold (8° C.) benzene, then washed with 300 ml. petroleum ether and dried in vacuo at room temperature, yielding 888 g. (80%) of methyl 3-amino-5,6-dichloropyrazinoate in the form of red crystals, M.P. 228–230° C. The crude product is dissolved in 56 liters of boiling acetonitrile and passed through a heated (70–80° C.) column of decolorizing charcoal (444 g.). The column is washed with 25 liters of hot acetonitrile, the combined eluate concentrated in vacuo to about 6 liters and chilled to 5° C. The crystals that form are filtered, washed three times with cold acetonitrile, and air dried to constant weight, yielding 724 g. (82% recovery, 66% overall) of methyl 3-amino-5,6-dichloropyrazinoate in the form of yellow crystals, M.P. 230–234° C. After additional recrystallizations from acetonitrile the product melts at 233–234° C.

*Analysis.*—Calculated for $C_6H_5Cl_2N_3O_2$: C, 32.46; H, 2.27; N, 18.93; Cl, 31.94. Found: C, 32.83; H, 2.35; N, 19.12; Cl, 31.94.

Step B: Preparation of methyl 3-amino-5-methylmercapto-6-chloropyrazinoate.—A solution of methyl mercaptan (10 g., 0.18 mole) in 20% aqueous sodium hydroxide (17 ml.) and methanol (100 ml.) is added during ten minutes to a boiling mixture of methyl 3-amino-5,6-dichloropyrazinoate (17.7 g., 0.08 mole) and methanol (1 liter). The mixture is refluxed an additional 15 minutes, cooled, and the solid collected and recrystallized from methanol to obtain 12 g. of methyl 3-amino-5-methylmercapto-6-chloropyrazinoate, M.P. 212–216° C. After further recrystallization from methanol, the product melts at 214–216° C.

*Analysis.*—Calculated for $C_7H_8ClN_3O_2S$: C, 35.98; H, 3.45; N, 17.98. Found: C, 36.24; H, 3.33; N, 17.91.

Step C: Preparation of methyl 3-amino-5-methylsulfinyl-6-chloropyrazinoate.—A mixture of methyl 3-amino-5-methylmercapto-6-chloropyrazinoate (23.4 g., 0.1 mole), 30% aqueous solution of hydrogen peroxide (35 ml.), and acetic acid (300 ml.) is stirred 18 hours at room temperature. The solid product is collected and weighs 18.5 g., M.P. 235–239° C. (dec.). It is satisfactory for synthetic use. A small sample recrystallized from a mixture of methanol, ethyl acetate and dimethylformamide melts at 237.5–240.5° C. (dec.).

*Analysis.*—Calculated for $C_7H_8ClN_3O_3S$: C, 33.67; H, 3.23; N, 16.83. Found: C, 33.79; H, 3.15; N, 16.72.

Step D: Preparation of methyl 3-amino-5-hydroxy-6-chloropyrazinoate.—A mixture of methyl 3-amino-5-methylsulfinyl-6-chloropyrazinoate (7.5 g., 0.03 mole) acetic acid (75 ml.) and water (12 ml.) is heated 3 hours on the steam bath. The product gradually crystallizes from the initially clear solution. It is collected and recrystallized from methanol-dimethylformamide to give 3.7 g. (61%) of methyl 3-amino-5-hydroxy-6-chloropyrazinoate which decomposes at about 245° C.

*Analysis.*—Calculated for $C_6H_6ClN_3O_3$: C, 35.39; H, 2.98; N, 20.69. Found: C, 35.69; H, 2.83; N, 20.57.

*Step E: Preparation of methyl 3 - amino - 5 - hydroxypyrazinoate.*—A mixture of methyl 3-amino-5-hydroxy-6-chloropyrazinoate (0.07 mole), 5% palladium on charcoal catalyst (9 g.) magnesium oxide (4.0 g., 0.1 mole) and methanol (250 ml.) is shaken with hydrogen for 18 hours at room temperature and at an initial hydrogen pressure of 30 p.s.i. The pressure drop indicates that 0.07 mole of hydrogen has been absorbed. The mixture is filtered, and the solids extracted with a boiling solution of 2-propanol (500 ml.) and water (250 ml.). The methanol filtrate and the extract solution are combined and concentrated to a volume of 100 ml. The methyl 3-amino-5-hydroxypyrazinoate obtained decomposes from 220 to 260° C.

*Analysis.*—Calculated for $C_6H_7N_3O_3$: C, 42.60; H, 4.17; N, 24.85. Found: C, 42.79; H, 4.29; N, 24.88.

*Step F: Preparation of (3-amino-5-hydroxypyrazinoyl) guanidine hydrochloride.*—Guanidine hydrochloride (5.0 g., 0.052 mole) is added to a solution of sodium (1.0 g., 0.043 g. atom) in 30 ml. of 2-propanol. Methyl 3-amino-5-hydroxypyrazinoate (1.7 g., 0.01 mole) is added and the mixture is heated 3 hours on the steam bath. The mixture is poured into a solution of 10 ml. concentrated hydrochloric acid in 50 ml. of water. The resulting solution is mixed with 20 ml. of concentrated hydrochloric acid. The salt which precipitates is recrystallized from water to yield 0.8 g. (34%) of (3-amino-5-hydroxypyrazinoyl) guanidine hydrochloride which decomposes above 310° C.

*Analysis.*—Calculated for $C_6H_8N_6O_2 \cdot HCl$: C, 30.98; H, 3.90; N, 36.13. Found: C, 31.07; H, 3.87; N, 35.93.

*Example 2.—(3,5-diaminopyrazinoyl)guanidine hydrochloride*

*Step A: Preparation of methyl 3,5-diamino-6-chloropyrazinoate.*—In a 2-liter, 3-necked flask fitted with a mechanical stirrer, thermometer and gas inlet tube is placed dry dimethyl sulfoxide (1 liter). Methyl 3-amino-5,6-dichloropyrazinoate (100 g., 0.45 mole) from Example 1, Step A, is added and the mixture stirred and heated at 65° C. on a steam bath until solution is effected. A stream of dry ammonia gas is admitted to the solution, with continuous stirring, over a period of 45 minutes while the temperature is maintained at 65–70° C. The solution is cooled to about 10° C. with continuous stirring and ammonia gas is admitted for an additional 1¼ hours. The yellow reaction mixture is poured, with stirring, into cold water (2 liters) and the light yellow solid that separates is removed by filtration, thoroughly washed with water, and dried in a vacuum desiccator to give 82.5 g. (91%) of methyl 3,5-diamino-6-chloropyrazinoate, M.P. 210–212° C. Recrystallization from acetonitrile gives material melting at 212–213° C.

*Analysis.*—Calculated for $C_6H_7ClN_4O_2$: C, 35.57; H, 3.48; N, 27.65. Found: C, 35.80; H, 3.38; N, 28.01.

*Step B: Preparation of methyl 3,5 - diaminopyrazinoate.*—A mixture of methyl 3,5-diamino-6-chloropyrazinoate (14.2 g., 0.07 mole), a 5% palladium on charcoal catalyst (9 g.), magnesium oxide (4.0 g., 0.1 mole) and methanol 250 ml. is shaken with hydrogen for 18 hours at room temperature and at an initial hydrogen pressure of 30 p.s.i. The pressure drop indicates an absorption of 0.07 mole of hydrogen. The mixture is filtered, and the solids extracted with a boiling solution of 500 ml. of 2-propanol and 250 ml. of water. The methanol filtrate and the extract solution are combined and concentrated to a volume of 100 ml. The methyl 3,5-diaminopyrazinoate which precipitates weighs 10.0 g. (85%), M.P. 247–250° C. (dec.). A further recrystallization raises the M.P. to 252–254° C. (dec.).

*Analysis.*—Calculated for $C_6H_8N_4O_2$: C, 42.85; H, 4.80; N, 33.32. Found: C, 43.15; H, 4.76; N, 33.11.

*Step C: Preparation of (3,5-diaminopyrazinoyl) guanidine hydrochloride.*—By replacing the methyl 3-amino-5-hydroxypyrazinoate employed in Step F of Example 1 by an equimolecular quantity of methyl 3,5-diaminopyrazinoate and following substantially the same procedure there described, except heating on the steam bath is continued for 15 minutes, there is obtained an 8% yield of (3,5-diaminopyrazinoyl)guanidine hydrochloride, M.P. 286–288° C. (dec.) after crystallization from water.

*Analysis.*—Calculated for $C_6H_9N_7O \cdot HCl$: C, 31.11; H, 4.36; N, 42.33. Found: C, 31.64; H, 4.42; N, 42.22.

*Example 3.—(3-amino-5-dimethylaminopyrazinoyl) guanidine*

*Step A: Preparation of methyl 3-amino-5-dimethylamino-6-chloropyrazinoate.*—In a 5 liter, 3-necked flask equipped with a mechanical stirrer and reflux condenser protected with a drying tube is placed methyl 3-amino-5,6-dichloropyrazinoate (178 g., 0.8 mole) (from Example 1, Step A) and 2-propanol (1.1 liters). While stirring, the suspension is treated with dimethylamine (200 g., 4.44 moles) in 2-propanol (2 liters) and the mixture then is refluxed for one hour. The solution is cooled in an ice bath and the crystalline product that separates is removed by filtration and dried. The yield of methyl 3-amino-5-dimethylamino-6-chloropyrazinoate is 177.2 g. (97%), M.P. 145–146.5° C. Recrystallization from methanol gives material melting at 145.5–146.5° C.

*Analysis.*—Calculated for $C_8H_{11}ClN_4O_2$: C, 41.66; H, 4.81; N, 24.29. Found: C, 41.73; H, 4.52; N, 24.24.

*Step B: Preparation of methyl 3-amino-5-dimethylaminopyrazinoate.*—This compound is prepared by essentially the same method described in Example 1, Step E, except that the methyl 3-amino-5-hydroxy-6-chloropyrazinoate is replaced by an equimolecular quantity of methyl 3-amino-5-dimethylamino-6-chloropyrazinoate. The product melts at 242.5–243.5° C.

*Analysis.*—Calculated for $C_8H_{12}N_4O_2$: C, 48.97; H, 6.17; N, 28.56. Found: C, 49.05; H, 5.91; N, 28.62.

*Step C: Preparation of (3-amino-5-dimethylaminopyrazinoyl)guanidine.*—Guanidine hydrochloride (5.8 g., 0.06 mole) is added to a solution of sodium (1.1 g., 0.05 g. atom) in methanol (30 ml.). The mixture is concentrated in vacuo to a syrup, methyl 3-amino-5-dimethylaminopyrazinoate (2.1 g., 0.012 mole) is added, and the reaction mixture heated 20 minutes on the steam bath. Ice-water is added, followed by 15 ml. of 5% hydrochloric acid. The solution is filtered, treated with 2 ml. of concentrated hydrochloric acid, and chilled to obtain a precipitate of the hydrochloride salt of the product. The salt is dissolved in water, and the solution made basic to precipitate the basic product which is recrystallized from aqueous isopropyl alcohol to obtain 1.2 g. of (3-amino-5-dimethylaminopyrazinoyl)guanidine, M.P. 224–225° C.

*Analysis.*—Calculated for $C_8H_{13}N_7O$: C, 43.04; H, 5.87; N, 43.93. Found: C, 43.18; H, 5.73; N, 43.63.

*Example 4.—(3-amino-5-methoxypyrazinoyl) guanidine hydrochloride*

*Step A: Preparation of methyl 3-amino-5-methoxy-6-chloropyrazinoate.*—Methyl 3 - amino-5,6-dichloropyrazinoate (1.1 g., 0.005 mole), from Example 1, Step A, is dissolved in 200 ml. of boiling anhydrous methanol and treated with a solution of sodium methoxide prepared from metallic sodium (115 mg., 0.005 g. atom) in anhydrous methanol (20 ml.). The product which separates on cooling, is filtered, rinsed with water and methanol and dried to give 1.0 g. (92%) of methyl 3-amino-5-methoxy-6-chloropyrazinoate which when recrystallized from acetonitrile melts at 255–257° C.

*Analysis.*—Calculated for $C_7H_8ClN_3O_3$: C, 38.63; H, 3.71; N, 19.31. Found: C, 39.00; H, 3.82; N, 18.76.

*Step B: Preparation of methyl 3-amino-5-methoxypyrazinoate.*—This compound is prepared by essentially the same method described in Example 1, Step E, except that the methyl 3-amino-5-hydroxy-6-chloropyrazinoate of Example 1, Step E, is replaced by an equimolecular quantity of methyl 3-amino-5-methoxy-6-chloropyrazinoate. The product melts at 205.5–207.5° C.

*Analysis.*—Calculated for $C_7H_9N_3O_3$: C, 45.90; H, 4.95; N, 22.94. Found: C, 45.32; H, 4.78; N, 22.79.

Step C: Preparation of (3-amino-5-methoxypyrazinoyl)guanidine hydrochloride.—By replacing the methyl 3-amino-5-hydroxypyrazinoate employed in Step F of Example 1 by an equimolecular quantity of methyl 3-amino-5-methoxypyrazinoate and following substantially the same procedure there described, except heating on the steam bath is continued for 30 minutes, there is obtained a 52% yield of (3-amino-5-methoxypyrazinoyl)guanidine hydrochloride, M.P. 229–230° C. (dec.), after crystallization from water.

*Analysis.*—Calculated for $C_7H_{10}N_6O_2 \cdot HCl$: C, 34.08; H, 4.49; N, 34.08. Found: C, 34.09; H, 4.71; N, 33.80.

*Example 5.—(3-amino-5-benzylaminopyrazinoyl) guanidine hydrochloride*

Step A: Preparation of methyl 3-amino-5-benzylamino-6-chloropyrazinoate.—A mixture of methyl 3-amino-5,6-dichloropyrazinoate (8.9 g., 0.04 mole) from Example 1, Step A, and benzylamine (20 ml.) is heated 30 seconds on the steam bath. The ester dissolves and the product precipitates and is recrystallized from methanol to give 7.5 g. (64%) of methyl 3-amino-5-benzylamino-6-chloropyrazinoate, M.P. 157–158° C.

*Analysis.*—Calculated for $C_{13}H_{13}ClN_4O_2$: C, 53.34; H, 4.48; N, 19.14. Found: C, 53.46; H, 4.46; N, 19.22.

Step B: Preparation of methyl 3-amino-5-benzylaminopyrazinoate.—This compound is prepared by essentially the same method described in Example 1, Step E, except that the methyl 3-amino-5-hydroxy-6-chloropyrazinoate of Example 1, Step E, is replaced by an equimolecular quantity of methyl 3-amino-5-benzylamino-6-chloropyrazinoate. The product melts at 189.5–191.5° C.

*Analysis.*—Calculated for $C_{13}H_{14}N_4O_2$: C, 60.45; H, 5.46; N, 21.70. Found: C, 60.61; H, 5.72; N, 21.62.

Step C: Preparation of (3-amino-5-benzylaminopyrazinoyl)guanidine hydrochloride.—By replacing the methyl 3-amino-5-hydroxypyrazinoate employed in Step F of Example 1 by an equimolecular quantity of methyl 3-amino-5-benzylaminopyrazinoate and following substantially the same procedure there described, except heating on the steam bath is continued for 20 minutes, there is obtained a 56% yield of (3-amino-5-benzylaminopyrazinoyl)guanidine hydrochloride, M.P. 231–233° C. (dec.), after crystallization from water.

*Analysis.*—Calculated for $C_{13}H_{15}N_7O \cdot HCl$: C, 48.52; H, 5.01; N, 30.47. Found: C, 48.68; H, 5.04; N, 30.48.

*Example 6.—(3-amino-5-methylpyrazinoyl)guanidine*

Step A: Preparation of methyl 3-amino-5-methylpyrazinoate.—A mixture of 3-amino-5-methylpyrazinoic acid (30 g., 0.20 mole) and a 30% solution of hydrogen chloride in methanol (650 ml.) is stirred at room temperature for 42 hours. The resulting solution then is evaporated to dryness in vacuo. The solid residue is stirred with sodium bicarbonate solution and the insoluble product collected. The crude product is recrystallized twice from water to yield 15.4 g. of methyl 3-amino-5-methylpyrazinoate, M.P. 163–167° C. A further recrystallization from water increases the melting point to 165–167° C.

*Analysis.*—Calculated for $C_7H_9N_3O_2$: C, 50.29; H, 5.43; N, 25.14. Found: C, 50.05; H, 5.35; N, 24.88.

Step B: Preparation of (3-amino-5-methylpyrazinoyl)guanidine.—By replacing the methyl 3-amino-5-dimethylaminopyrazinoate employed in Step C of Example 3 by an equilmolecular quantity of methyl 3-amino-5-methylpyrazinoate and following substantially the same procedure there described, except heating on the steam bath is continued for 18 minutes, there is obtained a 13% yield of (3-amino-5-methylpyrazinoyl)guanidine, M.P. 210° C. (dec.) after crystallization from ethanol.

*Analysis.*—Calculated for $C_7H_{10}N_6O$: C, 43.29; H, 5.19; N, 43.28. Found: C, 43.70; H, 5.28; N, 43.50.

*Example 7.—(3-amino-5-cyclohexylpyrazinoyl)guanidine*

Step A: Preparation of 7-cyclohexyllumazine.—A suspension of 5,6-diaminoauracil hydrochloride (17.9 g., 0.1 mole) in water (250 ml.) is heated to 60° C. and cyclohexylglyoxal hemihydrate (14.9 g., 0.1 mole) is added. The mixture is stirred and heated one hour on the steam bath. The mixture is cooled and the solid product is collected, dissolved in hot dilute sodium hydroxide solution, the solution filtered, and the product reprecipitated by acidification with hydrochloric acid. The product is treated with a boiling mixture of water (40 ml.) and acetic acid (90 ml.). A small amount of insoluble material is filtered off. The filtrate when cooled deposits 7.5 g. of 7-cyclohexyllumazine, M.P. 217–227° C. A further recrystallization from aqueous acetic acid increases the melting point to 229–231° C.

*Analysis.*—Calculated for $C_{12}H_{14}N_4O_2$: C, 58.52; H, 5.73; N, 22.75. Found: C, 58.59; H, 5.52; N, 23.02.

Step B: Preparation of 3-amino-5-cyclohexylpyrazinoic acid.—A solution of 7-cyclohexyllumazine (18.5 g., 0.075 mole) and sodium hydroxide (9.0 g., 0.225 mole) in water (90 ml.) is heated 17 hours at 165° C. in a sealed autoclave. The contents of the autoclave are flushed out with water (200 ml.). The insoluble material is filtered off and the filtrate acidified with hydrochloric acid to precipitate 12.5 g. of crude product, M.P. 172–176° C. which, when recrystallized from aqueous 2-propanol yields 8.0 g. of 3-amino-5-cyclohexylpyrazinoic acid, M.P. 182.5–183.5° C.

*Analysis*—Calculated for $C_{11}H_{15}N_3O_2$: C, 59.71; H, 6.83; N, 18.99. Found: C, 59.99; H, 6.56; N, 18.98.

Step C: Preparation of methyl 3-amino-5-cyclohexylpyrazinoate.—This compound is prepared by essentially the same method described in Example 6, Step A, except that an equimolecular quantity of 3-amino-5-cyclohexylpyrazinoic acid is substituted for the 3-amino-6-methylpyrazinoic acid of Example 6, Step A. The product has a M.P. 173–174.5° C.

*Analysis.*—Calculated for $C_{12}H_{17}N_3O_2$: C, 61.25; H, 7.28; N, 17.86. Found: C, 61.35; H, 7.39; N, 17.83.

Step D: Preparation of (3-amino-5-cyclohexylpyrazinoyl)guanidine.—By replacing the methyl 3-amino-dimethylaminopyrazinoate employed in Step C of Example 3 by an equimolecular quantity of methyl 3-amino-5-cyclohexylpyrazinoate and following substantially the same procedure there described, except heating on the steam bath is continued for 20 minutes, there is obtained a 71% yield of (3-amino-5-cyclohexylpyrazinoyl)guanidine, M.P. 221–222° C. (dec.), after recrystallization by first dissolving in dilute hydrochloric acid and reprecipitating by addition of dilute sodium hydroxide.

*Analysis.*—Calculated for $C_{12}H_{18}N_6O$: C, 54.94; H, 6.92; N, 32.04. Found: C, 55.04; H, 6.68; N, 31.54.

*Example 8.—(3-amino-5-phenylpyrazinoyl)guanidine*

Step A: Preparation of methyl 3-amino-5-phenylpyrazinoate.—This compound is prepared by essentially the same method described in Example 6, Step A, except that an equimolecular quantity of 3-amino-5-phenylpyrazinoic acid is substituted for the 3-amino-6-methylpyrazinoic acid employed in Example 6, Step A. The product has a melting point of 231–232° C.

*Analysis.*—Calculated for $C_{12}H_{11}N_3O_2$: N, 18.32. Found: N, 18.27.

*Step B: Preparation of (3-amino-5-phenylpyrazinoyl) guanidine.*—By replacing the methyl 3-amino-5-dimethylaminopyrazinoate employed in Step C of Example 3 by an equimolecular quantity of methyl 3-amino-5-phenylpyrazinoate and following substantially the same procedure there described except heating on the steam bath is continued for 20 minutes, there is obtained a 51% yield of (3-amino-5-phenylpyrazinoyl)guanidine, M.P. 224–226° C. (dec.) after crystallization from a mixture of acetonitrile and water.

*Analysis.*—Calculated for $C_{12}H_{12}N_6O$: C, 56.24; H, 4.72; N, 32.80. Found: C, 56.56; H, 5.01; N, 32.44.

*Example 9.—(3-amino-5-benzylpyrazinoyl)guanidine*

By replacing in Example 7, Step A, the cyclohexylglyoxal hemihydrate by an equimolecular quantity of phenylpyruvaldehyde and employing the other reactants and reaction conditions described in Step A of Example 7, there is obtained 7-benzyllumazine. By substituting this product in Step B of Example 7 for the 7-cyclohexyllumazine and then following the procedures described in Steps B through D of Example 7, there are obtained, successively 3-amino-5-benzylpyrazinoic acid, methyl 3-amino-5-benzylpyrazinoate and then (3-amino-5-benzylpyrazinoyl)guanidine.

*Example 10.—(3-amino-5-isopropylaminopyrazinoyl) guanidine*

*Step A: Preparation of methyl 3-amino-5-isopropylamino-6-chloropyrazinoate.*—This product is prepared following substantially the same procedure described in Example 3, Step A, except the dimethylamine is replaced by an equimolecular quantity of isopropylamine and heating is continued for three-quarters of an hour on the steam bath giving a 70% yield of product, M.P. 125.5–126.5° C. after recrystallization from 2-propanol.

*Analysis.*—Calculated for $C_9H_{13}ClN_4O_2$: C, 44.18; H, 5.36; N, 22.90. Found: C, 43.82; H, 5.18; N, 22.62.

*Step B: Preparation of (3-amino-5-isopropylaminopyrazinoyl)guanidine.*—By replacing the pyrazinoate employed in Example 3, Step B, by an equimolecular quantity of methyl 3-amino-5-isopropylamino-6-chloropyrazinoate and then following the same procedure and employing the other reactants and reagents called for in Steps B and C of Example 3, there is obtained (3-amino-5-isopropylaminopyrazinoyl)guanidine.

*Example 11.—[3-amino-5-(cyclopropylmethyl)aminopyrazinoyl]guanidine*

*Step A: Preparation of methyl 3-amino-5-(cyclopropylmethyl)amino - 6 - chloropyrazinoate.*—This product is prepared following substantially the same procedure described in Example 3, Step A, except the dimethylamine is replaced by an equimolecular quantity of (cyclopropylmethyl)amine and heating is continued for one-third of an hour on the steam bath giving a 78% yield of product, M.P. 132–133° C. after recrystallization from 2-propanol.

*Analysis.*—Calculated for $C_{10}H_{13}ClN_4O_2$: C, 46.78; H, 5.10; N, 21.83. Found: C, 46.93; H, 5.18; N, 21.92.

*Step B: Preparation of [3-amino-5-(cyclopropylmethyl)aminopyrazonyl]guanidine.*—By replacing the pyrazinoate employed in Example 3, Step B, by an equimolecular quantity of methyl-3-amino-5-(cyclopropylmethyl)amino-6-chloropyrazinoate and then following the same procedures and employing the other reactants and reagents called for in Steps B and C of Example 3, there is obtained [3-amino-5-(cyclopropylmethyl)aminopyrazinoyl]guanidine.

*Example 12.—(3-amino-5-anilinopyrazinoyl)guanidine*

*Step A: Preparation of methyl 3-amino-5-anilino-6-chloropyrazinoate.*—This product is prepared following substantially the same procedure described in Example 3, Step A, except the dimethylamine is replaced by a mixture of aniline (2.4 moles) and aniline hydrochloride (1.6 moles) and heating is continued for 24 hours on the steam bath giving a 71% yield of product, M.P. 171.5–173° C. after recrystallization from 2-propanol.

*Analysis.*—Calculated for $C_{12}H_{11}ClN_4O_2$: C, 51.71; H, 3.98; N, 20.10. Found: C, 51.33; H, 4.12; N, 20.30.

*Step B: Preparation of (3-amino-5-anilinopyrazinoyl) guanidine.*—By replacing the pyrazinoate employed in Example 3, Step B, by an equimolecular quantity of methyl 3-amino-5-anilino-6-chloropyrazinoate and then following the same procedures and employing the other reactants and reagents called for in Steps B and C of Example 3, there is obtained (3-amino-5-anilinopyrazinoyl)guanidine.

*Example 13.—[3-amino-5-(2,2,2-trifluoroethylamino) pyrazinoyl]guanidine*

*Step A: Preparation of methyl 3-amino-5-(2,2,2-trifluoroethylamino)-6-chloropyrazinoate.*—This product is prepared following substantially the same procedure described in Example 3, Step A, except the dimethylamine is replaced by an equimolecular quantity of 2,2,2-trifluoroethylamine and heating is continued for 72 hours in a sealed tube giving a 97% yield of product, M.P. 153–154° C. after recrystallization from 2-propanol.

*Analysis.*—Calculated for $C_8H_8N_4ClF_3O_2$: C, 33.76; H, 2.83; N, 19.69. Found: C, 34.10; H, 3.08; N, 19.57.

*Step B: Preparation of [3-amino-5-(2,2,2-trifluoroethylamino)pyrazinoyl]guanidine.*—By replacing the pyrazinoate employed in Example 3, Step B, by an equimolecular quantity of methyl 3-amino-5-(2,2,2-trifluoroethylamino)-6-chloropyrazinoate and then following the same procedures and employing the other reactants and reagents called for in Steps B and C of Example 3, there is obtained [3-amino-5-(2,2,2-trifluoroethylamino)pyrazinoyl]guanidine.

*Example 14.—[3-amino-5-(4-piperidylmethyl)aminopyrazinoyl]guanidine*

*Step A: Preparation of methyl 3-amino-5-(4-piperidylmethyl) - amino-6-chloropyrazinoate.*—This product is prepared following substantially the same procedure described in Example 3, Step A, except the dimethylamine is replaced by an equimolecular quantity of (4-piperidylmethyl)amine and heating is continued for one-half hour on the steam bath giving a 69% yield of product, M.P. 95–97° C. after recrystallization by dissolving in dilute hydrochloric acid and reprecipitating by addition of sodium hydroxide.

*Anaylsis.*—Calculated for $C_{12}H_{12}ClN_5O_2$: C, 49.07; H, 4.12; N, 23.85. Found: C, 48.66; H, 5.03; N, 23.35.

*Step B: Preparation of [3-amino-5-(4-piperidylmethyl) amino-pyrazinoyl]guanidine.*—By replacing the pyrazinoate employed in Example 3, Step B, by an equimolecular quantity of methyl-3-amino-5-(4-piperidylmethyl)amino-6-chloropyrazinoate and then following the same procedures and employing the other reactants and reagents called for in Steps B and C of Example 3, there is obtained [3 - amino-5-(4-piperidylmethyl)aminopyrazinoyl] guanidine.

*Example 15.—(3-amino-5-pyrrolidinylpyrazinoyl) guanidine*

*Step A: Preparation of methyl 3-amino-5-pyrrolidinyl-6-chloropyrazinoate.*—This product is prepared following substantially the same procedure described in Example 3, Step A, except pyrrolidine is substituted for the dimethylamine reactant and heating is continued for one-half hour on the steam bath giving a 95% yield of product, M.P. 168–171° C. after recrystallization from 2-propanol.

*Analysis.*—Calculated for $C_{10}H_{13}ClN_4O$: C, 46.78; H, 5.10; N, 21.83. Found: C, 47.01; H, 4.95; N, 21.86.

*Step B: Preparation of (3-amino-5-pyrrolidinylpyrazinoyl)guanidine.*—By replacing the pyrazinoate employed in Example 3, Step B, by an equimolecular quantity of methyl-3-amino-5-pyrrolidinyl-6-chloropyrazinoate and then following the same procedures and employing the other reactants and reagents called for in Steps B and C of Example 3, there is obtained (3-amino-5-pyrrolidinylpyrazinoyl)guanidine.

*Example 16.—(3-amino-5-piperidinopyrazinoyl) guanidine*

By replacing the dimethylamine reactant employed in Example 3, Step A, by an equimolecular quantity of piperidine and then following substantially the same procedure described except heating is continued for one-half hour on the steam bath, there is obtained methyl 3-amino-5-piperidino-6-chloropyrazinoate. Catalytic hydrogenolysis of this ester by the procedure described in Step B of Example 3, followed by reaction with guanidine as described in Step C of Example 3, gives (3-amino-5-piperidinopyrazinoyl)guanidine.

*Example 17.—1-(3,5-diaminopyrazinoyl)-3,3-dimethylguanidine hydrochloride*

A 300 ml. round-bottomed, one-necked flask fitted with a water-cooled condenser, calcium chloride drying tube and a magnetic stirrer is charged with anhydrous methanol (200 ml.) and metallic sodium (2.3 g., 0.10 g. atom). When the reaction is complete, the solution is treated with 1,1-dimethylguanidine sulfate (15 g., 0.055 mole) and heated at reflux for one hour. The solution is cooled, filtered to remove sodium sulfate, and the filtrate reduced by vacuum distillation to a volume of 30 ml. and methyl 3,5-diaminopyrazinoate (0.05 mole), from Example 2, Step B, is added. The reaction mixture is then treated by substantially the same procedure called for in Example 2, Step C, to yield 1-(3,5-diaminopyrazinoyl)-3,3-dimethylguanidine hydrochloride.

*Example 18.—1-(3,5-diaminopyrazinoyl)-3,3-tetramethyleneguanidine hydrochloride*

By replacing the guanidine employed in Example 17 by an equimolecular quantity of 1-amidinopyrrolidine nitrate and following substantially the same procedure called for therein, there is obtained 1-(3,5-diaminopyrazinoyl)-3,3-tetramethyleneguanidine hydrochloride.

*Example 19.—1-(3,5-diaminopyrazinoyl)-2,3-dimethylguanidine hydrochloride*

By replacing the guanidine employed in Example 17 by an equimolecular quantity of 1,2-dimethylguanidine hydriodide and following substantially the same procedure called for therein, there is obtained 1-(3,5-diaminopyrazinoyl)-2,3-dimethylguanidine hydrochloride.

*Example 20.—1-(3,5-diaminopyrazinoyl)-3-(2-hydroxyethyl)guanidine hydrochloride*

A solution of 2-methyl-2-pseudothiuronium sulfate (13.9 g., 0.05 mole) and ethanolamine (9.2 g., 0.15 mole) in water (40 ml.) is heated 20 minutes on the steam bath. The solution is evaporated to dryness in vacuo and the syrupy residue stirred with ethanol to give a crystalline product. After recrystallization from aqueous ethanol there is obtained 12.5 g. of (2-hydroxyethyl)guanidine sulfate, M.P. 127.5–135.5° C. (hygroscopic). By replacing the guanidine employed in Example 17 by an equimolecular quantity of (2-hydroxyethyl)guanidine sulfate and following substantially the same procedure called for therein, there is obtained 1-(3,5-diaminopyrazinoyl)-3-(2-hydroxyethyl)guanidine hydrochloride.

*Example 21.—1-(3,5-diaminopyrazinoyl)-3-phenylguanidine hydrochloride*

By replacing the guanidine employed in Example 2, Step C, by an equimolecular quantity of phenylguanidine, and following substantially the same procedure called for therein, there is obtained 1-(3,5-diaminopyrazinoyl)-3-phenylguanidine hydrochloride.

*Example 22.—1-(3,5-diaminopyrazinoyl)-3-benzylguanidine*

*Step A: Preparation of benzylguanidine hydrochloride.*—A mixture of benzylamine (80.3 g., 0.75 mole) and 2-methyl-2-pseudothiuronium sulfate (69.5 g., 0.25 mole) in water (200 ml.) is allowed to stand at room temperature for 18 hours. Methyl mercaptan is evolved and benzylguanidine sulfate separates as a crystalline precipitate. The salt is collected and dried, yielding 78 g. (0.196 mole) of product, M.P. 203–207° C. The salt is dissolved in 200 ml. of boiling water and a saturated aqueous solution of barium chloride dihydrate (48.8 g., 0.2 mole) is added. The precipitate of barium sulfate is filtered off. The filtrate is evaporated to dryness in vacuo, and the residue, which crystallizes, is recrystallized from aqueous ethanol to give 51.5 g. (55% of theoretical, based on the amount of 2-methyl-2-pseudothiuronium sulfate used) of benzylguanidine hydrochloride, M.P. 175–178° C.

*Analysis.*—Calculated for $C_8H_{11}N_3 \cdot HCl$: N, 22.62. Found: N, 22.45.

*Step B: Preparation of 1-(3,5-diaminopyrazinoyl)-3-benzylguanidine.*—Benzylguanidine hydrochloride (9.3 g., 0.05 mole) is added to a solution of sodium (1.0 g., 0.043 g. atom) in 30 ml. isopropyl alcohol. The mixture is concentrated to one-half the original volume by vacuum distillation. Methyl 3,5-diaminopyrazinoate (from Example 2, Step B) (1.68 g., 0.01 mole) is added and the reaction mixture is heated on a steam bath. Approximately 150 ml. of cold water then is added whereby 1-(3,5-diaminopyrazinoyl)-3-benzylguanidine separates.

*Example 23.—1-(3,5-diaminopyrazinoyl)-3-(4-methoxybenzyl)guanidine*

*Step A: Preparation of (4-methoxybenzyl)guanidine hydrochloride.*—By replacing the benzylamine employed in Example 22, Step A, by an equimolecular quantity of 4-methoxybenzylamine and following substantially the same procedure described therein, there is obtained a 69% yield of (4-methoxybenzyl)guanidine hydrochloride, M.P. 132–137° C.

*Analysis.*—Calculated for $C_9H_{13}N_3O \cdot HCl$: N, 19.48. Found: N, 19.20.

*Step B: Preparation of 1-(3,5-diaminopyrazinoyl)-3-(4-methoxybenzyl)guanidine.*—By replacing the benzylguanidine hydrochloride employed in Step B of Example 22 by an equimolecular quantity of (4-methoxybenzyl)amine, and following substantially the same procedure described in Step B of Example 22 there is obtained 1-(3,5-diaminopyrazinoyl)-3-(4-methoxybenzyl)guanidine.

The novel compounds of this invention can be compounded in the usual oral or parenteral dosage forms for use in therapy in the treatment of conditions resulting from an abnormal electrolyte excretion pattern of an animal organism. It will be appreciated that the dosage of each individual compound will vary over a wide range depending upon the relative potency of the selected compound and also depending upon the age and weight of the particular patient to be treated and upon the particular ailment to be treated. For these reasons, tablets, pills, capsules and the like containing, for example, from 5 to 500 mg. or more or less active ingredient can be made available for the symptomatic adjustment of the dosage to the individual patient. As each of the compounds of this invention can be incorporated in a dosage form similar to those described in the following examples, or other usual dosage forms suitable for oral or parenteral administration, which can be prepared by well-known methods, only one example is included herein to illustrate the preparation of representative dosage forms.

*Example 24.—Dry filled capsule containing 50 mg. of active ingredient*

| | Per capsule, mg. |
|---|---|
| (3,5-diaminopyrazinoyl)guanidine hydrochloride | 50 |
| Lactose | 273 |
| Magnesium stearate | 2 |
| Mixed powders | 325 |

Mix the (3,5-diaminopyrazinoyl)guanidine hydrochloride, from Example 2, lactose, and magnesium stearate and reduce to a No. 60 mesh powder. Encapsulate, filling 325 mg. in each No. 2 capsule.

The above and other formulations that would be readily apparent to a pharmacist can be employed to prepare compressed tablets or capsules of the other novel compounds of this invention hereinbefore described.

It is also contemplated to combine compounds of this invention in unit dosage form with other known diuretic agents, such as, hydrochlorothiazide, 4'-methyl-6-chlorospiro - [2H-1,2,4-benzothiadiazide - 3(4H) - 1'-cyclohexane]-7-sulfonamide 1,1-dioxide, trichloromethiazide, cyclopenthiazide, acetazolamide, dichlorphenamide, chlorthalidone, chlormerodrin, chlorazinil, furosemide or spironolactone and the like. One example of such a combination is presented below:

*Example 25.—Combination dosage form in dry filled capsule*

| | Per capsule, mg. |
|---|---|
| 1-(3,5-diaminopyrazinoyl)-3-benzylguanidine from Example 22) | 50 |
| Hydrochlorothiazide | 50 |
| Magnesium stearate | 2 |
| Lactose | 223 |
| Mixed powders | 325 |

Mix all of the above ingredients, reduce to a No. 60 mesh powder and encapsulate, filling 325 mg. in each No. 2 capsule.

It is further contemplated to combine compounds of this invention with hypotensive agents, or steroids or other desired therapeutic agents in suitable dosage form.

While the above examples describe the preparation of certain compounds which are illustrative of the novel compounds of this invention, and certain specific dosage forms suitable for administering the novel compounds, it is to be understood that the invention is not to be limited to the specific compounds described in the examples or by the specific reaction conditions described for the preparation of these compounds or by the specific ingredients included in the pharmaceutical preparations, but is to be understood to embrace variations and modifications thereof which fall within the scope of the appended claims.

What is claimed is:

1. A product selected from the group consisting of a compound having the general structural formula $$\text{R}-\underset{\text{N}}{\overset{\text{N}}{\bigcirc}}\begin{array}{l}-\text{NHX}^1\\-\text{CONH}-\underset{\|}{\text{C}}-\text{NR}^3\text{R}^4\\\quad\quad\text{NR}^2\end{array}$$

and pharmaceutically acceptable salts thereof, wherein:

R is selected from the group consisting of hydroxyl; lower alkyl; lower alicyclic; lower alkoxy; phenyl; phenyl-lower alkyl; —NR'R" wherein R' is selected from the group consisting of hydrogen, and lower alkyl, and R" is selected from the group consisting of hydrogen, lower alkyl, halo-lower alkyl, (lower alicyclic-alkyl), phenyl-lower alkyl, (4-piperidyl)-lower alkyl, and phenyl; and $$-\text{N}\underset{}{\overset{}{\bigcirc}}(\text{CH}_2)_n$$

wherein $n$ is one of the numerals 4 through 7;

$R^2$ is selected from the group consisting of hydrogen and lower alkyl;

$R^3$ is selected from the group consisting of hydrogen, lower alkyl, hydroxy-lower alkyl, phenyl-lower alkyl, alkoxy-phenyl-lower alkyl, and phenyl;

$R^4$ is selected from the group consisting of hydrogen and lower alkyl;

when $R^3$ and $R^4$ are each lower alkyl, they can be joined together to form with the nitrogen atom to which they are attached one of the cyclic structures 1-pyrrolidinyl, piperidino, 1-piperazinyl, 4-lower alkyl-1-piperazinyl and morpholino;

when $R^2$ and $R^3$ are each lower alkyl, they can be joined together to form with the nitrogen atoms to which they are attached an imidazolinyl radical; and $X^1$ is a number of the group selected from hydrogen and lower alkanoyl.

2. A product as claimed in claim 1, wherein R is hydroxyl and each of the variable radicals $X^1$, $R^2$, $R^3$ and $R^4$ is hydrogen.

3. A product as claimed in claim 1, wherein R is lower alkyl and each of the variable radicals $X^1$, $R^2$, $R^3$ and $R^4$ is hydrogen.

4. A product as claimed in claim 3, wherein R is methyl.

5. A product as claimed in claim 1, wherein R is cyclohexyl and each of the variable radicals $X^1$, $R^2$, $R^3$ and $R^4$ is hydrogen.

6. A product as claimed in claim 1, wherein R is lower alkoxy and each of the variable radicals $X^1$, $R^2$, $R^3$ and $R^4$ is hydrogen.

7. A product as claimed in claim 1, wherein R is —NH$_2$ and each of the variable radicals $X^1$, $R^2$, $R^3$ and $R^4$ is hydrogen.

8. A product as claimed in claim 1, wherein R is —NH$_2$, $R^3$ is benzyl and each of the variable radicals $X^1$, $R^2$ and $R^4$ is hydrogen.

9. A product as claimed in claim 1, wherein R is —NH$_2$, each of the variable radicals $R^3$ and $R^4$ is lower alkyl, and each of the variable radicals $X^1$ and $R^2$ is hydrogen.

10. A product as claimed in claim 1, wherein R is —NH$_2$, each of the variable radicals $R^2$ and $R^3$ is lower alkyl, and each of the variable radicals $X^1$ and $R^4$ is hydrogen.

11. A product as claimed in claim 1, wherein R is —NH$_2$, $R^3$ is 2-hydroxyethyl, and each of the variable radicals $X^1$, $R^2$ and $R^4$ is hydrogen.

12. A product as claimed in claim 1, wherein R is benzylamino, and each of the variable radicals $X^1$, $R^2$, $R^3$, and $R^4$ is hydrogen.

13. A product as claimed in claim 1, wherein R is phenyl, and each of the variable radicals $X^1$, $R^2$, $R^3$ and $R^4$ is hydrogen.

References Cited

UNITED STATES PATENTS 3,240,780   3/1966   Cragoe et al. _____ 260—250

NICHOLAS S. RIZZO, *Primary Examiner.*